United States Patent [19]

Yazawa et al.

[11] 3,853,662

[45] Dec. 10, 1974

[54] METHOD FOR LAMINATING UNIAXIALLY STRETCHED THIN LAYERS OF FILM AS WARPS AND WEFTS

[75] Inventors: Masahide Yazawa, Tokyo; Kimio Inoue, Kobeshi, both of Japan

[73] Assignees: Polymer Processing Research Institute Ltd., Tokyo; Kobe Steel Co., Ltd., Kobeshi, Hyogoken, Japan

[22] Filed: Aug. 1, 1973

[21] Appl. No.: 384,546

Related U.S. Application Data

[63] Continuation-in-part of Ser. No. 214,571, Jan. 3, 1972, abandoned.

[30] Foreign Application Priority Data

Jan. 19, 1971  Japan.............................. 46-1273

[52] U.S. Cl................. 156/265, 156/272, 156/285, 156/299
[51] Int. Cl....................... B32b 31/00, B29c 17/00
[58] Field of Search ........... 156/264, 265, 385, 181, 156/256, 272, 299, 285

[56] References Cited
UNITED STATES PATENTS

| | | | |
|---|---|---|---|
| 3,147,166 | 9/1964 | Friday............................. | 156/264 |
| 3,250,655 | 5/1966 | Adler............................... | 156/265 |
| 3,360,415 | 12/1967 | Hellman et al. ................ | 156/285 |
| 3,546,846 | 12/1970 | Sens................................. | 156/285 |
| 3,576,695 | 4/1971 | Stine................................. | 156/264 |

*Primary Examiner*—Douglas J. Drummond
*Attorney, Agent, or Firm*—Fred Philpitt

[57] ABSTRACT

A laminate is prepared from uniaxially stretched layers of film as warps and wefts by supplying a uniaxially stretched thin layer of film, cut to a desired length, continuously at a constant speed over a belt circulating at a speed higher than the layer-supporting speed through a pinching-and-forwarding means provided in proximity to the circulating belt, while sucking the cut layer onto the belt by a negative pressure exerted below from the belt, subjecting the layer to frictional rubbing by sliding on the belt owing to a difference between the layer-supplying speed and the belt-circulating speed, placing the thin layer upon the belt by suction at the time when the rear end of the thin layer has passed through the pinching-and-forwarding means thereby to make the thin layer move at a speed equal to that of the belt, allowing successive thin layers, cut to the desired length, to be transferred onto the belt by suction at a distance corresponding to the difference between the layer-supplying speed and belt-circulating speed one by one, bringing the thin layer as wefts over a warped thin air-permeable layer of uniaxially stretched materials of film having cleavages as warps, the thin layer wefts being crossed over the thin layer warps, allowing the thin layer wefts to be placed upon the continuously running warps by drawing force exerted between the warps and wefts or pushing down from the belt towards warps forcibly immediately when the wefts are brought in a position where the length of wefts is over-lapped entirely with the width of warps, and placing the successive wefts upon the successive warps continuously without any substantial gaps by repetition of said steps.

4 Claims, 7 Drawing Figures

METHOD FOR LAMINATING UNIAXIALLY STRETCHED THIN LAYERS OF FILM AS WARPS AND WEFTS

CROSS-REFERENCE TO RELATED APPLICATION

The present invention is a continuation-in-part of our copending application Ser. No. 214571 filed January 3, 1972 now abandoned.

DESCRIPTION OF THE INVENTION

This invention relates to a method for laminating uniaxially stretched thin layers of film as wefts and warps, and more particularly to a method for laminating uniaxially stretched thin layers of film as wefts and warps in a nonwoven manner by continuously placing wefts upon warps without any occurrence of discontinuation of weft layer.

In the present invention, the term "uniaxially stretched thin layers of film" means (1) a web or webs prepared by extending to a desired width a split fiber web of reticular structure obtained by splitting a uniaxially stretched film having a large width, and further by warping the same, or a like web or webs whose fiber arrangement is further fixed with a binder, (2) a large number of split fiber webs prepared by splitting stretched film having a small width, and warping a large number of said narrow split fiber webs in parrallel to a desired width, or a web fixedly arranged with a binder, (3) a large number of stretched tapes having a small width, which have been warped to a desired width, or their webs which have been warped and fixedly arranged to a desired width with a binder of such a shaped article as fibers or films, or (4) a web of uniaxially stretched films having a definite large width or stretched films having a small width arranged and warped to a desired width without any discontinuation, their arrangement being fixed with a binder of shaped article, and a laminate of wefts and warps mentioned above has such advantages as very high tearing strength and very high strength in both weft and warp directions, because the uniaxially stretched materials are in a continuous structure to full length in both weft and warp directions.

The present invention resorts to a process for laminating uniaxially stretched layers of film as warps and wefts, which comprises supplying a uniaxially stretched thin layer of film, cut to a desired length, continuously at a constant speed over a belt circulating at a speed higher than the layer-supplying speed through a pinching-and-forwarding means provided in proximity to the circulating belt, while sucking the layer onto the belt by a negative pressure exerted below from the belt, subjecting the layer to frictional rubbing by sliding on the belt owing to a difference between the layer-supplying speed and the belt-circulating speed, placing the thin layer upon the belt by suction at the time when the rear end of the thin layer has passed through the pinching-and-forwarding means thereby to make the thin layer move at a speed equal to that of the belt, allowing successive thin layers, cut to the desired length, to be transferred onto the belt by suction at a distance corresponding to the difference between the layer-supplying speed and the belt-circulating speed one by one, bringing the thin layer as wefts over a warped thin air-permeable layer of uniaxially stretched materials of film having cleavages as warps, the thin layer wefts being crossed over the thin layer warps, allowing the thin layer wefts to be placed upon the continuously running warps by drawing force exerting between the warps and wefts or pushing down from the belt towards the warps forcibly immediately when the wefts are brought in a position where the length of wefts is over-lapped entirely with the width of warps, and placing the successive wefts upon the successive warps continuously without any substantial gaps by repetition of said steps.

As a method for placing wefts upon the warps by suction immediately when the wefts on a circulating belt are transferred to a position where the length of wefts is overlapped entirely with the width of warps, there are available three methods, that is, method (a), method (b) and method (c). According to the method (a), a negative pressure chamber is provided at the back side of the wefts and another negative pressure chamber at the backside of the warps, and wefts are placed upon the warps by a negative pressure exerted from the backside of the warps alone or assisted by pushing force when the wefts are over-lapped with the warps. According to the method (b), a negative pressure chamber is provided at the backside of the weft and the sucked weft on the belt is subjected to momentary pushing down force off the belt towards the warps, that is, it is possible to arrange wefts upon warps orderly by the repetition of the operations of pushing wefts attached on the belt by a suction, down toward warps running under said belt to let them fall upon the warps by the pushing-down force of a number of linear edges whenever a weft comes along on the position wholly overlapping with a warp, said linear edges being moved with the belt and installed in the inside of the circulating route of the weft attached on the belt so as to cross the wefts. According to the method (c), a front part of wefts is sucked onto a circulating belt by a negative pressure and subjected to frictional rubbing by the circulating belt, which runs at a higher speed than the weft-supplying speed, while a rear part of the wefts is retained by a pinching-and-forwarding means. The wefts are electrostatically charged by the friction, electrostatically sucked to the belt and transferred with the belt. When the wefts are over-lapped with the warps, an electric potential is applied to the wefts and warps by electrode plates placed outside the weft and warp positions, and the wefts are electrostatically deposited upon the warps thereby.

When a number of fibrous materials arranged in order are to be attached on a belt by a suction as wefts, it is necessary to use an air-permeable circulating belt. For such belts, porous cloths, flexible perforated plates, or lattice belt can be used and particularly, lattice belts give superior result because gaps between lattices can be optionally determined. In order to make the inside space of the circulating route of the belt serve as a suction chamber, its sides must be provided with a shielding wall having a felt, dense brush or the like on its contacting parts with the belt in order to prevent the outside air from entering into said chamber as much as possible.

The method (a) is illustrated in the accompanying drawings, FIGS. 1, and 2 and method (b) is illustrated in the accompanying drawings, FIGS. 3, 4, 5, 6 and 7, but the method (c) is not illustrated in the accompanying drawings and will be explained later.

Now, the present invention will be explained, referring to the accompanying drawings.

FIG. 1 is a schematic view of a system for laminating warps and wefts by continuously supplying a uniaxially stretched thin layer of film as wefts at a constant speed over a belt circulating at a higher speed than the layer-supplying speed while cutting the thin layer to a desired length, subjecting the thin layer to friction and sliding over the belt owing to a difference between the belt-circulating speed and the layer-supplying speed, while being sucked onto the belt by a negative pressure exerted below the belt, making the thin layer as wefts placed onto the belt by suction at the time when the rear end of the thin layer has passed through a pinching-and-forwarding means after being cut to the desired length, allowing the thin weft layer to be transferred with the belt at the belt-circulating speed, and placing the wefts onto warps through suction by means of a negative pressure chamber provided below the warps immediately when the wefts are over-lapped with the warps.

Figure 1:
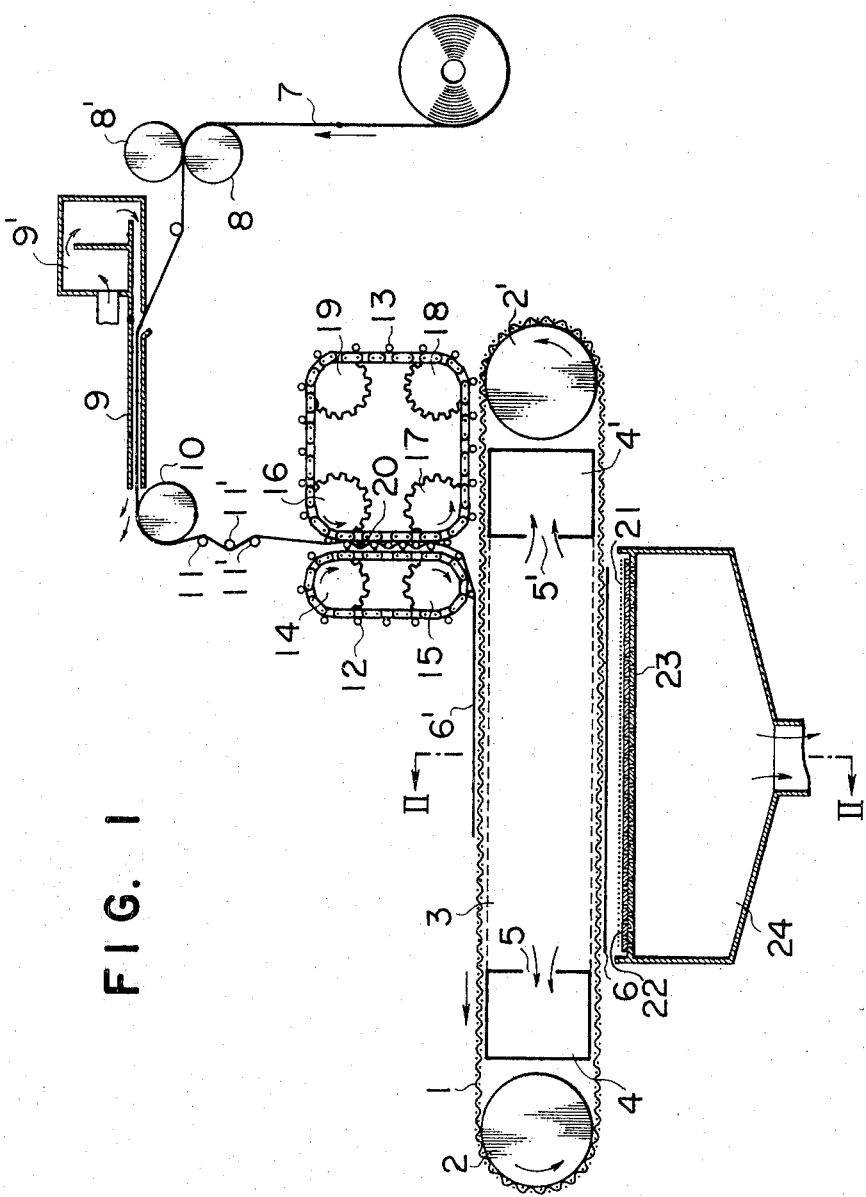

In FIG. 1, a circulating belt 1 circulates between guide rollers 2 and 2'. Since a higher air-permeability is required in the methods (a) and (b), a reticular belt is suitable. On the other hand, the air-permeability may be small in the method (c), and thus the belt can be made from any suitable material such as metal, cloth, etc. There is a low negative pressure chamber 3 between the guide rollers 2 and 2' in the belt-circulating course, that is belt-forwarding and returning course. The low negative pressure chamber 3 is kept under a low negative pressure by air suction through openings 5 and 5' at pipes 4 and 4', respectively. The degree of negative pressure will be sufficient inasmuch as it can prevent thin layer wefts 6 and successive thin layer wefts 6' on the belt from falling by gravity, when the wefts are turned down below the belt by the circulation of the belt.

In FIG. 1, the thin layer wefts are, for example, a split fiber web 7. The web drawn out at a constant speed by pinch rollers 8 and 8' is supplied into a forwardly expanded, flat air channel 9 by suction exerted by a high speed air supplied from an air box 9', and tangentially injected onto a roller 10. The web is extended to a desired width thereby and vertically suspended down (See Japanese Patent Publication No. 22790/69). The web is then passed over a series of resistance rods 11 and 11' and pinched by and between circulating pinch lattice belts 12 and 13. Then, the web is supplied as wefts onto the circulating belt 1 below the lattice belts 12 and 13. When the web is extended to the desired width, warped and fixed with a binder in advance, the air channel 9 having a constant width can be used only to read-just the width and center position of the web deformed after winding or in the course of rewinding. When the thin layer wefts are a web of a large number of stretched narrow tapes warped in parallel and fixed with a binder, such a web can be directly supplied to the guide roller 10 without using the air channel.

The pinch lattice belt 12 circulating between guide chain wheels 14 and 15 engages with the lattice belt 13 and acts to forward the web, but the entire peripheral length of the lattice belt 13 circulating around chain wheels 16, 17, 18 and 19 is made equal to the length of the thin layer wefts. One of rods constituting the lattice is a melt cutter rod 20 in a red-hot state and acts to melt-cut the thin layer wefts once at every turn of the chain lattices around the chain wheels 16, 17, 18 and 19. An electric wiring is connected to the melt cutter rod 20, though not shown in the drawing, and an electric current is passed therethrough by slip rings to heat the melt cutter rod. When a pitch of the lattices provided on the chain is 40 mm and the projected width, that is the diameter of a lattice rod is 10 mm, there is a clearance of 30 mm between the two rods. When a lattice rod of any of the lattice belts 12 and 13 is inserted therebetween to forward the web, the clearance between the rod and the newly inserted rod is 10 mm. If there is a clearance of 10 mm between the rods, the melt end of the web of the thin layer wefts never adheres to the lattice rod. When the lattice belts 12 and 13 are engaged with each other, the web is pinched therebetween in a zigzag manner, and can be forwarded without any slipping. When the web is pinched by the melt cutter rod 20, the web is melt-cut within a short period of time, but the melt cut end is forwarded down as it is pinched between the belts. As soon as the forward end of the cut web reaches the circulating belt, the web is sucked onto the belt by the negative pressure exerted below from the belt. Since the belt-circulating speed is higher than the web-supplying speed, the web is subjected to friction and sliding action by the belt, while being sucked onto the belt. When the web is electrostatically charged by the friction, the lattices are also electrostatically adversely charged and consequently the web can be attracted onto the belt without any suction. However, when there is much moisture in the atmosphere, the generated electrostatic charge can be little retained in the web, and thus the web is usually sucked onto the belt by a negative pressure exerted below from the belt. This assures smooth operation and the web disturbance is made less.

As soon as the rear end of the cut web leaves the pinching-and-forwarding means, the web is sucked onto the circulating belt and moves at a speed equal to the belt-circulating speed. Successively, the tip end of the next web 6' reaches the belt, and is sucked onto the belt. The web 6' is subjected to friction and is placed onto the belt by suction in the same manner as above. As soon as the weft web 6 is brought in a position where the full length of the weft web 6 is over-lapped with the full width of the warp web 21, openings of two perforated plates 22 and 23, both serving as upper walls of a negative pressure chamber below the warps 21 are over-lapped and consequently a negative pressure from the negative pressure chamber 24 acts upon the wefts 6 through the warps 21. When the air is sucked into the negative pressure chamber 24 through the porous circulating belt 1, the wefts 6 are sucked onto the warps 21. According to this method, the degree of negative pressure of the negative pressure chamber 24 must be higher than the degree of negative pressure of the negative pressure chamber 3. As soon as the wefts 6 are sucked onto the warps 21, the positions of openings 22 and 23 of the negative pressure chamber 24 are dislocated from one another, whereby most of the openings are closed.

According to another method, though not shown in the drawing, the down side track for the belt 1 is made to approach the warps intermittently by vertically movable guides as soon as the wefts are over-lapped with the warps, and consequently, the wefts are left thereby from the suction range of the upper negative pressure chamber and enters into the suction range of the lower negative pressure chamber below the warps. Thus, the wefts are sucked onto the warps by suction.

As soon as the resulting laminate of warps and wefts are moved only by the width of wefts, the next wefts 6' are sucked onto the successive warps. In this case, warps are arranged in a single weft layer in parallel without any over-lapping of the wefts with the successive wefts. However, by placing the successive wefts upon the warps by suction when the preceding wefts are moved by half of the width of the wefts, the wefts are always over-lapped with another weft, and therefore a product having a double fiber density of weft can be obtained.

According to the method (a), there is a residual effect of the preceding suction upon the air stream, when the successive wefts are moved over the warps immediately after the preceding wefts are placed upon the warps by suction, and consequently the successive wefts on the circulating belt are peeled off or disturbed thereby. Therefore, it is necessary that the successive wefts come upon the belt at a time interval enough for said residual effect to disappear. Unless the speed of the circulating belt is made higher in correspondence to said time interval, it is impossible to carry out laminating operation without any discontinuation of the weft. That is, the difference between the weft-feeding speed and the belt-circulating speed is experimentally determined.

According to the method (b), since pushing down force is used as a method for carrying out laminating operation, a number of linear edges which are installed in the inside of the circulating route of wefts attached on a belt in such an arrangement that they cross with wefts and move together with the belt, are pushed down from the surface of the belt. When a belt provided with the above-mentioned linear edge is a porous cloth or a flexible porous belt, a thin piano wire or a monofilament such as a nylon fishing line or other extremely small count yarns which is stretched and laid along the surface of the cloth or the reticular belt tightly through a coil spring on its both ends, can be used as linear edges. When a lattice belt is used, a thick wire, a rubber string or an edge of a thin metal plate which is placed perpendicularly to the surface of the circulating route of the belt and capable of being pushed down from the belt surface can be used.

An embodiment of the present invention will be illustrated through an example of apparatus wherein edges of thin metal plates disposed perpendicularly to the surface of a circulating route of a belt so as to be pushed down from the surface of a lattice belt, is used.

Figure 3:
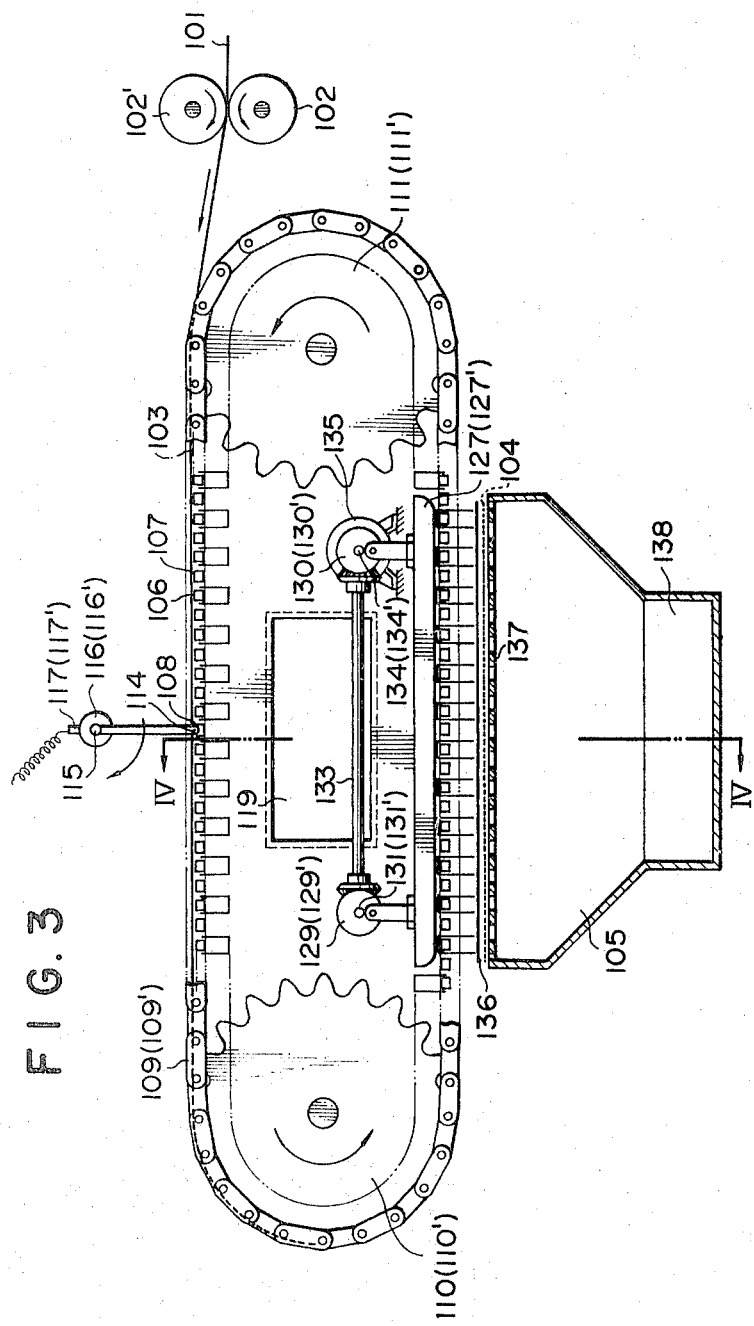
FIG. 3 is a schematic view of a system for bringing wefts onto running warps utilizing pushing down force off the belt and FIG. 4 is a cross-sectional view of FIG. 3 along a cutting line IV—IV.
Figure 4:
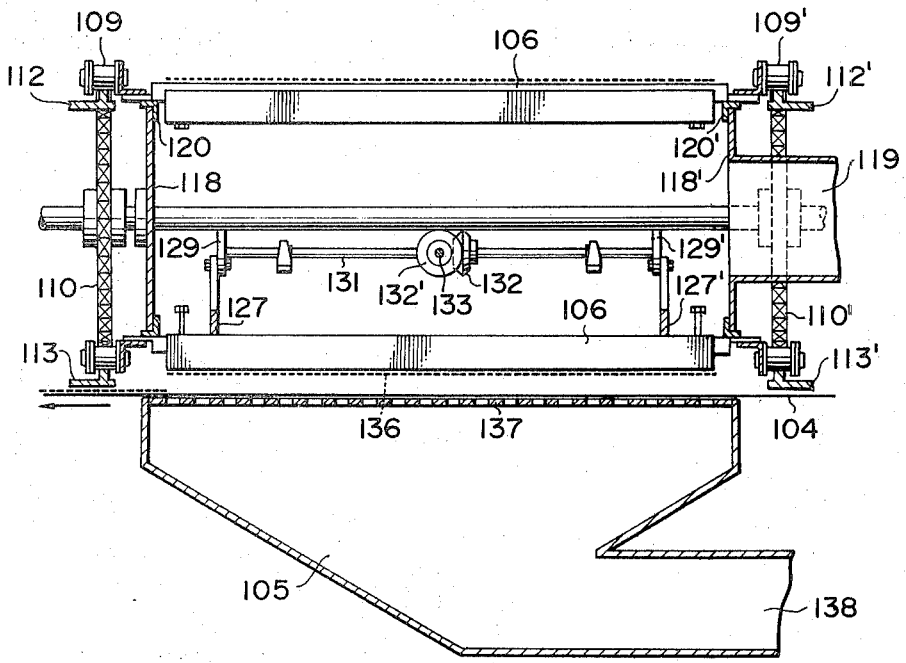

Referring now to FIGS. 3 and 4, when high density stretched polyethylene tapes are used as fibrous materials, a number of the above-mentioned stretched tapes 101 arranged in order as wefts are delivered through pinch rollers 102 and 102' onto a circulating belt 103 at a controlled feeding speed. The circulating belt is disposed horizontally with the lower circulating route thereof apart from the warp crosswise travelling under the belt by such a distance that a usually larger suction force of a negative pressure chamber 105 on the backside of warps consisting of a number of stretched tape 104, does not give substantial influence upon the smaller suction force used for the holding of the wefts on the circulating belt from backside thereof.

Figure 6:
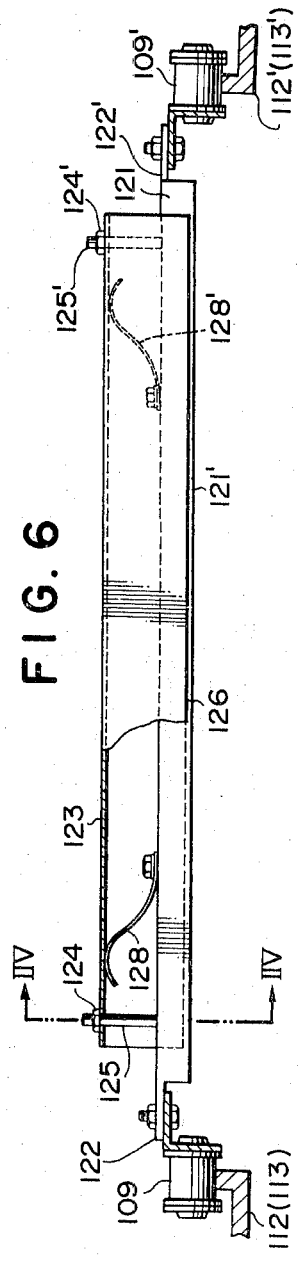
FIG. 6 is one element of the lattice belt shown in FIG. 3.

The circulating belt has a width sufficient to carry wefts to be fed, and a number of lattice elements 106 have a construction hereinafter described in detail in FIGS. 6 and 7. Between two neighbouring elements 106, other simple elements having no linear edges 107 are disposed with as small gaps as possible, and elements 108 having a convex cross-section which are placed at every regular interval greater than required weft length are disposed in place of elements 107. The ends of individual lattice both left and right, are connected to left or right endless chains 109 and 109' at a regular pitch. These left and right endless chains 109 and 109' circulate in the direction of arrow through circulating pathes by left and right sprocket wheels 110, 110' for left and 111, 111' for right fixed to left and right side common axes, respectively so as to have a horizontal circulating route of the lattice belt longer than the required length of a weft, with a speed faster than the feeding speed of the weft. The horizontal parts of circulating pathes of the endless chains are held horizontally with horizontal guide rails 112, 112', 113 and 113' on both upper and lower sides.

Figure 5:
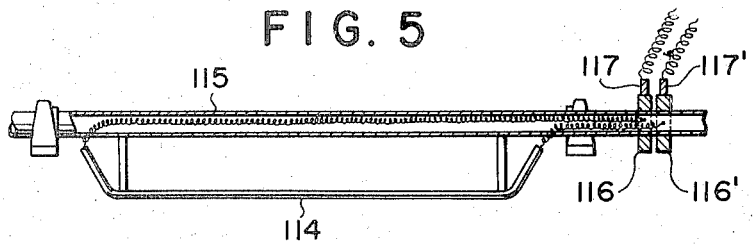
FIG. 5 is a schematic view of the cutting device shown in FIG. 3.

A red heated sheathed wire 114 for cutting wefts, which wire meshes with a convex lattice 108, revolves as shown hereinafter in FIG. 5, arounds a horizontal axis 115 which is parallel to lattice elements. Its peripheral speed of revolution is identical to the circulating speed of belt 103 and its peripheral length is selected to be identical to the distance between the two neighboring convex elements 108 on the lattice belt 103. The feed of electricity to the red heated sheathed wire is effected through the inside of an axis 115 from two slip rings 116 and 116' provided at one end of the axis 115 with corresponding contacting brushes 117 and 117'.

The wefts fed are cut into a length which is determined according to the feeding speed of the wefts and time necessary for the red heated sheathed wire 114 to do one circulation. Since the circulating belt circulates faster than the feeding speed of wefts by 5 – 50 percent, the wefts fed run while sliding on the surface of the lattice belt until they are cut but after being cut, they move with a speed same with that of the lattice belt while holding a distance from the successive weft corresponding to the above-mentioned difference of speeds.

In the inside space of the circulating route of the lattice belt, there are walls 118 and 118' on both sides, one of which is provided with a conduit 119 connected to an exhauster (not shown). In the parts of the side walls 118 and 118' contacting the circulating lattices there are applied felt pieces 120 to prevent the entry of atmospheric air by leakage. One example of the lattice element 106 having linear edges which performs the function of pushing down of wefts is illustrated in FIGS. 6 and 7. Numeral 121 is a lattice element made of a hollow square tube, the left and right ends of which are connected through arms 122 and 122' to left and right endless chains 109 and 109', respectively. 121' is a weft-attaching surface of a hollow square tube lattice element forming a surface of circulating lattice belt. The pushing down member 123 having a trough-like channel configuration is installed in such a way that it covers the lattice element 121 from the backside and opens in the direction of the surface of circulating belt. It is guided at parts close to its both ends by respective guide bars 125 and 125' having lock nuts 124 and 124' and moves in the direction perpendicular to the surface of the lattice belt. The linear edges 126 and 126' of trough-like member 123 have fine indentation like teeth of saw throughout their entire length. Usually they are situated in the inside of the circulating route of the surface of lattice belt but when the backside of the trough 123 is knocked by ski-edges 127 and 127' they stick out of the surface of lattice belt and when the ski-edges rise upward, they retreat to their original positions by the function of spring plates 128 and 128' provided on the backside of the lattice elements and in the inside of the trough 123.

The ski-edges 127 and 127' provided on the backside surface of underside route of circulating lattice belt have lengths sufficient to knock the whole backsides of the lattice elements 106 corresponding to cut length of a weft by one beat. It is so arranged that a nylon resin block is provided on the surface contacting with the lattice element to ensure sound-proof effect. The ski-edges 127 and 127' are connected at their both ends to eccentric cams 129, 129' and 130, 130'. By the revolution of these cams, the ski-edges perform rise and fall motion to knock the backside of the lattices 106. Eccentric cams 129 and 129' installed at both ends of axis 131 and connected, through bevel gears 132 and 132' on the middle of the shaft and through a shaft 133 to the axes 134 of eccentric cams 130 and 130'. The shaft 134 is connected to a motor 135 provided with an electric clutch and brake, and at a predetermined regular interval of time, it quickly starts, and after one revolution, it quickly stops. It is so arranged that by this action, when a weft comes to a position where it overlaps wholly with a warp, ski-edges 127 and 127' knock the back surface of the lattice element 106 to shoot out the adhering weft 136 in a moment from the surface of the circulating lattice belt 103 toward the direction of the warp to be sucked and made to adhere onto the warp 104.

On the other hand, the warps 104 consisting of a large number of fibrous materials arranged in order are running horizontally just above the negative pressure chamber 105 provided with a perforated plate on the top. The chamber 105 is connected through a conduit 138 to an exhauster (not shown). The top surface of the chamber 105 has a sufficient size for sucking the wefts just knocked from the circulating belt 103 by a number of linear edges 126 and 126' toward the direction of warps to deposit thereupon and form laminates.

The distance between the underside of the route of the circulating belt 103 and the top side of suction surface of the chamber 105 under the warps will be sufficient, if it is such a distance that the negative pressure in the inside of the chamber 105 under the warps i.e., the influence of suction force acting on the top side of warps does not substantially reach the wefts of a predetermined length which adhere to the underside of the circulating belt. So long as wefts are not extremely coarse, the suction force in the inside of the circulating belt will not be necessarily so large, but the suction force of underside of warp requires a negative pressure greater than that in the inside space of the circulating belt in order to suck wefts in the stabilized state onto the warps without disorder and hence the velocity of the atmospheric air flowing into the falling space with the above-mentioned distance is liable to become greater. Further when the sizes of wefts in length and width are large and hence area becomes larger, the amount of air flowing into the above-mentioned space from the sides becomes larger and the wefts which are knocked down from the surface of circulating belt and falling freely by suction are liable to be distrubed by the influence of this inflowing air. Accordingly, in such a case, stabilized lamination of warp and weft containing almost no disorder cannot be obtained unless the distance between the underside surface of the circulating belt and warp is made greater and at the same time, the distance of falling of wefts by the pushing of linear edges is made greater but the distance of free falling thereof after leaving the linear edges as short as possible. For example in case a lamination of warps having a width of 1,200 mm and wefts having a width of 1,200 mm is to be carried out, the above-mentioned distance can be selected in the range of 80 – 150 mm when the above-mentioned stretched tapes having a width of 6 mm, arranged in 8 mm pitch are used for warps and wefts. The distance between the linear edges at the maximum projection and warps will be sufficient if it is 20 mm at the largest and below 15 mm in usual case. Accordingly the method of the present invention is an effective lamination method for producing particularly, non-woven cloths of laminated layers of warp and weft having a large plane fiber density.

Further, when a method of (b) is used for catching wefts on warps, a method which comprises catching wefts falling by knock-down upon warps which are running in a horizontal direction, through suction force of a negative pressure chamber provided under the warps, can be used as stated hereinbefore. However, there is also another method which does not rely on a negative pressure chamber i.e., a method in which knocked-down wefts are caught in a stabilized manner on dampened warps by utilizing surface tension of water. There is also a further method to allow wefts to stick to pasted warps.

When the catching is carried out with dampened warps, such an arrangement is made that a dampened circulating cloth or rubber belt for carrying the warps on the upper circulating route of the belt is used instead of the above-mentioned negative pressure chamber and belt on the upper side circulating route is caused to run in the same direction and the same velocity with those of the warps and a revolving brush roller and a water vessel is provided to dampen the belt during the underside circulation route of the belt.

In this case, wefts knocked down from above are caught by the surface tension of water while holding warps between the belt and wefts.

Even according to the method (c), the belt-circulating speed is high enough to electrostatically charge the wefts. When the wefts are supplied onto the belt in an electrostatically charged state, moved over the belt together with the belt and laminated onto the warps according to the method (c), the belt-circulating speed may be a little higher than the weft-supplying speed. However, to prevent the disturbance of wefts it is usually preferable in all of the methods (a), (b) and (c) that the belt-circulating speed is 15 – 30 percent higher than the weft-supplying speed.

Figure 2:
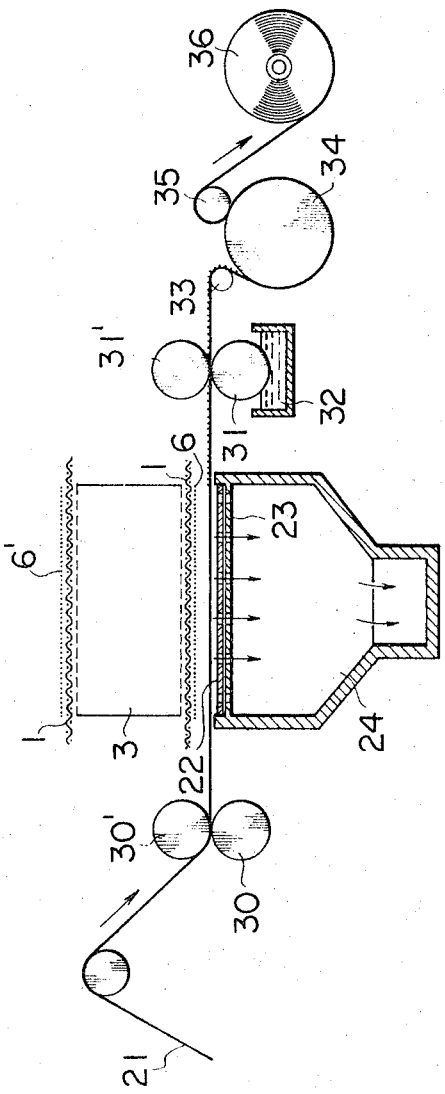
FIG. 2 is a cross-sectional view along the line II—II of FIG. 1 and schematically shows a system for processing the warps in the warp direction.

FIG. 2 shows a cross-section view along the line II—II of FIG. 1, and illustrates steps for running the warps. The warps are warped to a desired width, and passed through pinch rollers 30 and 30'. Wefts are placed upon the warps in the weft-laminating zone, and then the warps thus laminated with the wefts are transferred to successive step through pinch rollers 31 and 31'. When the laminate of warps and wefts is not treated with a binder and dried in advance, a binder emulsion bath 32 is placed below the roller 31, and a binder is applied to the laminate of warps and wefts. The thus treated laminate is passed through a guide roller 33 and dried over a drying drum 34, where the binder is also dried. Then, the laminate is heat-pressed by a pressure roller 35, and wound up onto a roller 36 as a product. A hot air drier chamber (not shown in the drawing) can be used in place of the drier drum.

When both warps and wefts are treated with the binder and dried in advance, the resulting laminate of warps and wefts can be passed directly onto the heating roller 34 without any passage through the pinch rollers 31 and 31', and can be heat-pressed between the rollers 34 and 35 after the preheating on the heating roller 34.

In the foregoing, explanation has been made mainly as to the case where the raw materials are webs of split fibers. In the case where the raw materials are stretched narrow tapes warped to a desired width, the tapes piled with a binder film after the warping and heat-pressed to fix the tape arrangement are used as weft raw material, and the warped narrow tapes leaving gaps for air permeability are used as warp tapes. The weft raw materials are placed upon the warp tapes by suction exerted by the negative pressure. When the lamination is carried out so that the binder film may be inserted between the warp tapes and weft tapes as an intermediate layer in that case, a good result can be obtained in heat pressing of the warps and wefts.

Also in the case where a laminate of warps and wefts of uniaxially stretched, broad film is prepared, a product having an appearance almost equal to that of a laminate of warps and wefts where the uniaxially stretched films are laminated as such, can be obtained by laminating one side of the uniaxially stretched film for wefts with a binder film in advance, then laminating the thus prepared wefts with uniaxially stretched film slitted into a large number of tapes of the desired width and arranged in parallel while maintaining the original width of the stretched film as such to endow air permeability to the warps, and heat-pressing the laminate.

The foregoing explanation of the present invention made in reference to FIGS. 1 and 2 is concentrated upon the case where the wefts are placed upon the warps by utilizing the sucking action of negative pressure according to the method (a), and the explanation made in reference to FIGS. 3, 4, 5, 6 and 7 is concentrated upon the case where wefts are subjected to pushing down force off the belt towards the warps according to the method (b). When the electrostatic attraction is utilized according to the method (c), the ambient humidity is controlled so that the wefts are sufficiently electrostatically charged by friction due to the difference between the speeds, and then the wefts are transferred upon the belt by electrostatic attraction. At the moment when the wefts are over-lapped with the warps, an electrical potential of 15 to 30 KV is instantaneously applied thereto by electrode plates positioned in parallel on the outside of the warps and wefts. The wefts are deposited upon the warps by electrostatic attraction. In that case, the negative pressure chamber 3 between the guide rollers 2 and 2' for circulating the belt in FIG. 1 is only made to an upper half section of said chamber, and an electrode plate is placed at the position of the lower half section of said chamber. Further, another electrode plate is placed in place of the negative pressure chamber 24 below the warps. When the wefts are attracted upon the circulating belt by electrostatic attraction, the lower half section of the negative pressure chamber 3 is not necessary even in the methods (a), (b) and (c). Furthermore, if the weft raw materials can be sufficiently electrostatically charged before they are placed upon the belt, and can be well deposited upon the belt electrostatically, the negative pressure chamber 3 is not necessary at all.

EXAMPLE 1

A web obtained by splitting a uniaxially stretched, broad film of high density polyethylene having a width of 600 mm and a thickness of 0.02 mm was extended to a width of 1,200 mm and treated with an emulsion of copolymer of ethylene-vinyl acetate and dried, whereby an extended web of split fibers provided with a binder was prepared. The basic weight of a web of split fibers was 9.6 g/m$^2$, and the basic weight of dried binder was 2.5 g/m$^2$. One half of the web was used as warps as it is, and other half thereof was made to a width of 1,240 mm by passing it through an air channel having a width of 1,240 mm and especially having narrower opening on both the edge parts of the channel by about 20 mm wide. The thus adjusted web had a lower split fiber density only at the edge parts and used as a weft web.

According to the processes illustrated in FIGS. 1 and 2 embodying the method (a), the warp web and the weft web were laminated so that both thin edge parts of the adjoining weft webs might be over-lapped by 40 mm over the warp web, while the circulating belt run at 75 m/min and the warp web proceeded at 50 m/min. Even if the weft web had a somewhat irregular width, the irregularity in thickness due to the discontinuation or over-lapping could be overcome thereby, and a laminate having an average basic weight of split fibers of 19.2 g/m$^2$ and that of the binder of 5 g/m$^2$ was obtained.

The thus prepared laminate was applied as a reinforcing material for low density polyethylene film or paper or non-woven fabric, that is, flat, entangled mass of short fibers. When 15 to 30 percent by weight of the laminate was usually used as the reinforcing material together with the paper or non-woven fabric, the paper or non-woven fabric could be made more suitable for disposable clothings or interior articles. Further when the film, paper and the non-woven fabric were used as materials for bags, the lateral (bulge) direction of bags could be reinforced by making the split fiber content of the weft web larger than that of the warp web.

EXAMPLE 2

130 stretched tapes of high density polyethylene, each having a width of 7 mm and a thickness of 0.03 mm, were warped to a width of 1 m, and a film of low density polyethylene having a thickness of 0.02 mm and a width of 1 m was heat-pressed upon the tapes as a binder film. The resulting web was used as wefts. A web of 130 tapes warped in parallel was used as warps. The warps and wefts were laminated according to the processes of FIGS. 1 and 2 at a weft pitch, i.e., distance between one weft and successive weft, of 30 cm on the circulating belt, so that the binder film might be sandwiched between the warp tapes and weft tapes, and the resulting laminate was heat-pressed, whereby a film product having no air permeability, which was reinforced by stretched tapes as warps and wefts, was obtained.

EXAMPLE 3

60 stretched warp tapes and 60 stretched weft tapes of the same as those in Example 2 were prepared into a latticed laminate film, where the stretched warp tapes and the stretched weft tapes were crossed with each other as lattices and supported by a film, in the same manner as in Example 2. Then, in the next step the thus prepared latticed laminate film was passed through a hot air chamber, where a hot air was injected to the laminate at a temperature high enough to melt the low density polyethylene having a low melting point, under such a condition that the stretched tapes could be prevented from shrinkage, for example, by pinching the wefts by a tenter frame. The melted polymer of the film was made to gather around the surrounding stretched tapes, whereby a laminate of stretched tapes having air-permeating openings among the crossings of the tapes could be obtained.

In that case, a product having fine lattices could be obtained by warping tapes having a width of 2 – 3 mm at a distance of 2 – 3 mm and laminating the thus warped tapes as warps and wefts. By properly adjusting the thickness and width of the tapes, and further by properly adjusting tape distances, a reticular laminate having proper openings among crossings, or laminates with paper or non-woven fabric could be obtained. By making the tape distances zero, a product corresponding to a laminate film of warps and wefts consisting of uniaxially stretched film having a desired width could be obtained.

EXAMPLE 4

180 ends of stretched tapes of high density polyethylene, each having a width of 6 mm and a thickness of 0.02 mm were taken out through pinch roller in parallel from 6 winding cores provided with large flanges, upon which cores each 30 ends of above-mentioned tapes had been wound, while unwinding each of the cores. After subjecting to heat treatment by passing over a heat-treatment drum, tapes were separated into two equal portions, each of separated portions is passed through combs to give a pitch of 15 mm, further each of the groups is passed in parallel through a fiber splitting tool revolving at a high speed and provided with pinch rollers and turn rollers on both sides of the tool to take out in the form of split yarns. 90 ends of yarns from one of the groups are fed into a warp and weft laminating machine having a construction shown in FIGS. 3 and 4 with a pitch of 15 mm, as it is, and a velocity of 54 m/min. 90 ends of split yarns from the remaining group which were fed at a velocity of 54 m/min. were supplied over laminate after laminating wefts upon warps in the apparatus of FIG. 3 so as to give an arrangement that they pressed the wefts from the top with a pitch of 15 mm and each just entered the gaps between the warp split yarns arranged in parallel to give finished warps having 180 ends of yarns with a pitch of 7.5 mm.

Separately 180 ends of tapes of the same kind as that of the warps were drawn out in parallel from 6 winding cores, arranged in parallel by passing through a comb to give a pitch of 7.5 mm and after being split by a splitting tool of the same structure as above-mentioned, the tapes were passed over a heating drum to apply heat treatment and fed as wefts upon the warps from the transverse direction at right angle to the warps at a velocity of 52 m/min.

The lattice elements corresponding to 106 in FIG. 3 of the circulating belt of a warp-and-weft laminating machine was a square pipe having a length of 1,500 mm, a width of 20 mm, a height of 20 mm and a thickness of 1 mm. Both the ends of each lattice were connected through short arms to attachment of every other links of right and left roller chains with A-1 attachment of JIS No. 80 forming two endless chains, each consisting of 300 links (pitch is 25.4 mm) and circulating in parallel on both the sides of the belt.

Figure 7:
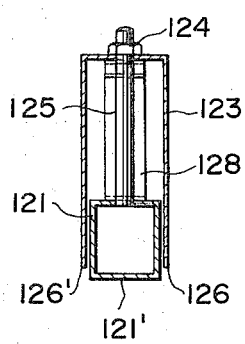
FIG. 7 is a cross-sectional view of the element shown in FIG. 6 along a cutting line VII—VII.

The trough-shape pushing tools which are open on the side confronting the surface of circulating belt shown in FIG. 7 by numeral 123, were made of metal plates having a thickness of 0.5 mm, a length of 1,500 mm, a width of 25 mm, and a height of 85 mm. Linear edges 126 and 126' of the opening end are filed transversely with a coarse file and furnished in such a way that they terminate at positions 2 mm inside the weft-carrying surface of lattices on both the sides and have push down stroke of 80 mm.

The lattice elements corresponding to 107 in FIG. 3 were square pipes having a length of 1500 mm, a width of 20 mm, a height of 20 mm and a thickness of 1 mm and were provided between the two neighbouring lattice elements 106 in the same manner as that of lattice element 106 and trough shape lattice elements corresponding to 108 in FIG. 3 having a length of 1,500 mm, a width of 20 mm and a height of 20 mm were provided in every 60 links in place of lattice element 107 in such a way that opening parts confront the surface of the circulating belt. The red heated sheathed wire corresponding to 114 in FIG. 3 was so constructed that its peripheral length of revolution of the center was 1,524 mm (radius of revolution of 242.6 mm) and it was enabled to circulate around the axis 115 with a same circulation velocity as that of circulation belt. The distance between warps and the underside surface of the circulating belt was 90 mm.

Wefts on the circulating belt had a length of 129.5 mm and a width of 1,350 mm and were arranged with a space between each other and each weft were kept in a state covering the surface of the circulating belt. The suction pressure at this time fluctuated in the range of 5 – 7 mm $H_2O$ column.

The suction pressure under warps was 50 mm $H_2O$ column and it was so arranged that tetrafluoroethylene pipes (containing steel wires therein as reinforcement) having an outside diameter of 2 mm were placed with a pitch of 15 mm so as to cross the warps over a perforated plate of suction chamber in perpendicular relationship and the warps were caused to run over these pipes in order to lower the friction between the perforated plate and the warps as low as possible.

Wefts were knocked down by the linear edges of trough of lattice elements 106 at a rate of 40 wefts per minute and sucked upon the warps to give the state of arrangement having almost no gaps therebetween.

The warps carrying wefts thereupon were supplied with the above-mentioned 15 mm pitch of 90 ends of split yarns as a presser of wefts, with a relationship of one presser yarn between two neighboring split yarns of the warps and thereafter led to a pasting roller. The paste used was an emulsion of a copolymer (solid matter 40 percent) consisting of about 30 percent (by weight) of vinyl acetate and about 70 percent (by weight) of ethylene. The applied amount of paste was 15 g/m² in term of solid matter.

After pasting, pasted weft-carrying warps were passed over 8 steam-heated drums having a diameter of 600 mm to do drying and then over-heated pressing rollers to effect sufficient adhesion by pressing. After pressing, both the selvages were cut off to give split-yarn-cloth of warp-and-weft lamination having a width of 1250 mm. Resultant laminates (a) were laid upon the polyethylene side surface of kraft paper having a density of 80 g/m² coated with 0.02 mm thick soft polyethylene on one side of said kraft paper and pressed while on heating to give further laminates (b). Resultant laminates (b) were compared with commercial kraft paper (80 gr/m²) reinforced with woven cloth of 0.02 mm thick and 6.5 mm wide stretched high density polyethylene tapes arranged at a count of 3 tapes per 25 mm on both warp and weft (c). The former (b) was superior to the latter (c) in all physical properties.

The present process as described above is applicable to any uniaxially stretched material of polymer having a fiber-forming ability.

In the foregoing explanation and Examples, description has been made only of the laminate whose warps and wefts are crossed with each other at a right angle, but when the wefts are placed upon the warps in an inclined position against the warps, the circulating belt for supplying the wefts must be arranged so as to cross the warps at an inclined angle against the warp running direction.

When the wefts are laminated onto the warps so that the wefts themselves may be crossed with each other at two stages, a laminate strong in the warp direction as well as the direction inclined against weft direction but poor in dimensional stability in lateral direction can be obtained. When wefts are further laminated at an inclined angle onto a laminate whose warps and wefts are crossed with each other at a right angle, a laminate product strong in longitudinal, lateral and inclined directions can be obtained.

What is claimed is:

1. A process for laminating uniaxially stretched layers of film as warps and wefts, which comprises supplying a uniaxially stretched thin layer of film, cut to a desired length, continuously at a constant speed over a belt circulating at a speed higher than the layer-supplying speed through a pinching-and-forwarding means provided in proximity to the circulating belt, while sucking the layer onto the belt by a negative pressure exerted below from the belt, subjecting the layer to frictional rubbing by sliding over the belt owing to a difference between the layer-supplying speed and the belt-circulating speed, placing the thin layer upon the belt by suction at the time when the rear end of the thin layer has passed through the pinching-and-forwarding means thereby to make the thin layer move at a speed equal to that of the belt, allowing successive thin layers, cut to the desired length, to be transferred onto the belt by suction at a distance corresponding to the difference between the layer-supplying speed and the belt-circulating speed one by one, bringing the thin layer as wefts over a warped thin air-permeable layer of uniaxially stretched materials of film having cleavages as warps, the thin layer wefts being crossed over the thin layer warps, allowing the thin layer wefts to be placed upon the continuously running warps by drawing force exerting between the warps and wefts immediately when the wefts are brought in a position where the length of wefts is overlapped entirely with the width of warps, and placing the successive wefts upon the successive warps continuously without any substantial gaps by repetition of said steps.

2. A process according to claim 1, wherein the thin layer wefts are placed upon the warps by air suction exerted by negative pressure below from the warps.

3. A process according to claim 1, wherein the thin layer wefts are placed upon the warps by electrostatic attraction exerted by electric potential between two electrodes plates provided in parallel outside the warps and wefts.

4. A process for bringing wefts onto a warp running continuously in a process for laminating uniaxially stretched layers of film as warps and wefts, which comprises supplying a uniaxially stretched thin layer of film continuously at a constant speed over a belt circulating at a speed higher than the layer-supplying speed through a pinching and supplying means provided in proximity to the circulating belt, while sucking the supplied layer onto the belt by a negative pressure exerted from the back-side of the belt; subjecting the layer to cutting to a desired length to prepare wefts one after another, thereby allowing the wefts to move at a speed equal to that of the belt after the time when the rear end of the thin layer has passed through a cutting means, leaving a distance from the successive weft, corresponding to the difference between the layer-supplying speed and the belt-circulating speed; bringing the thin layer as wefts over a warped thin air-permiable layer of uniaxially stretched materials of film having cleavages as warps; subjecting the weft to be placed upon the continuously running warps to a momentary pushing down force off the belt towards the running warp immediately when the wefts are brought in a position where the length of wefts is overlapped entirely with the width of warps.

* * * * *